March 3, 1953     E. S. PRINCE     2,630,082
FOOD HANDLING IMPLEMENT
Filed Feb. 7, 1949     3 Sheets-Sheet 1
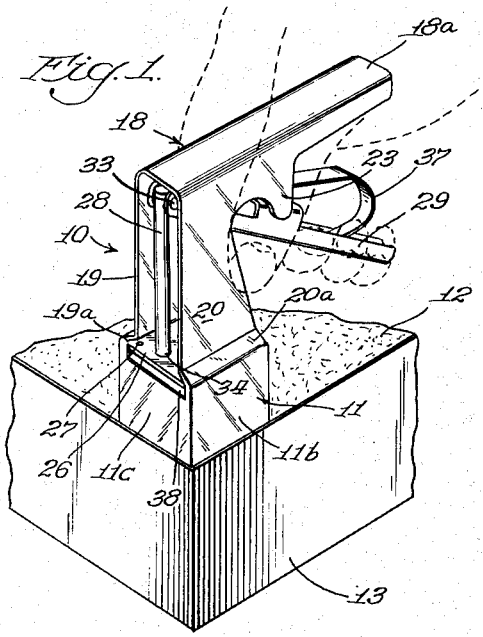
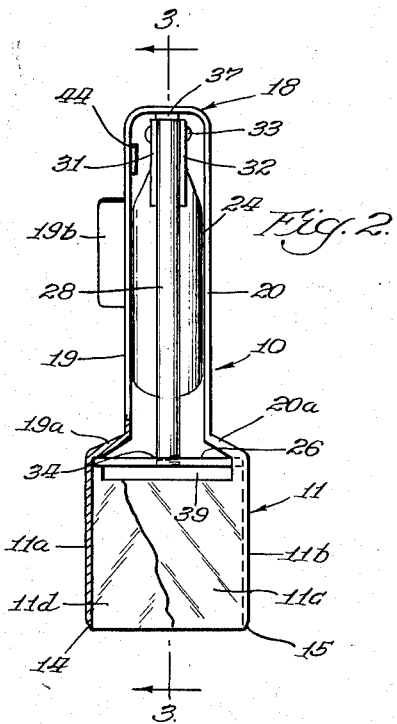
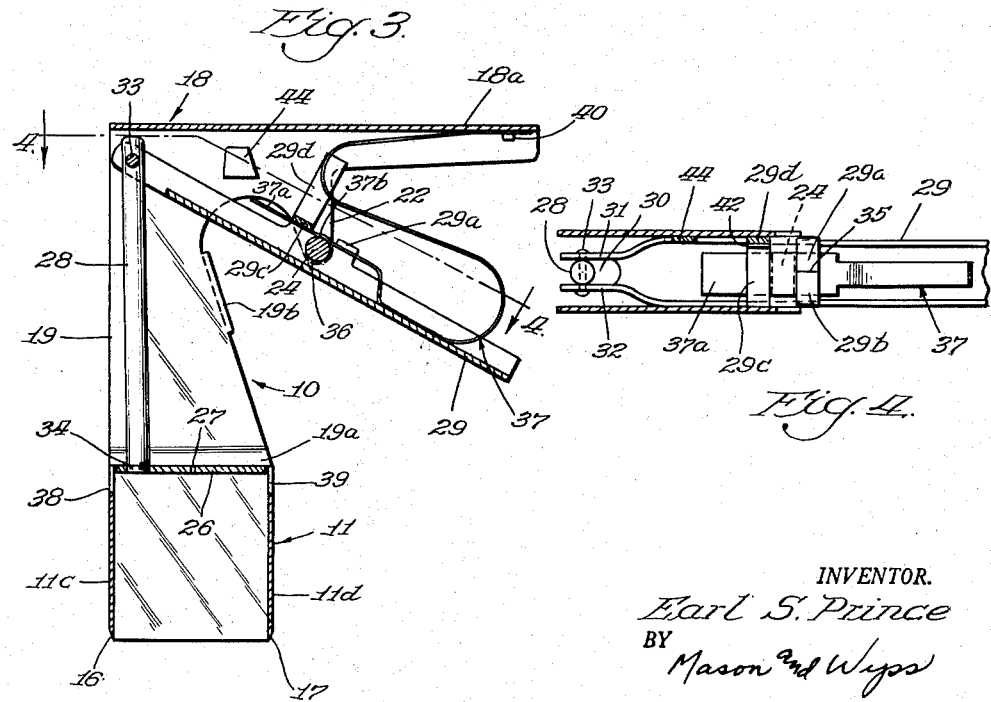
INVENTOR.
Earl S. Prince
BY Mason and Wyss
Attys.

March 3, 1953        E. S. PRINCE        2,630,082
FOOD HANDLING IMPLEMENT
Filed Feb. 7, 1949        3 Sheets-Sheet 2
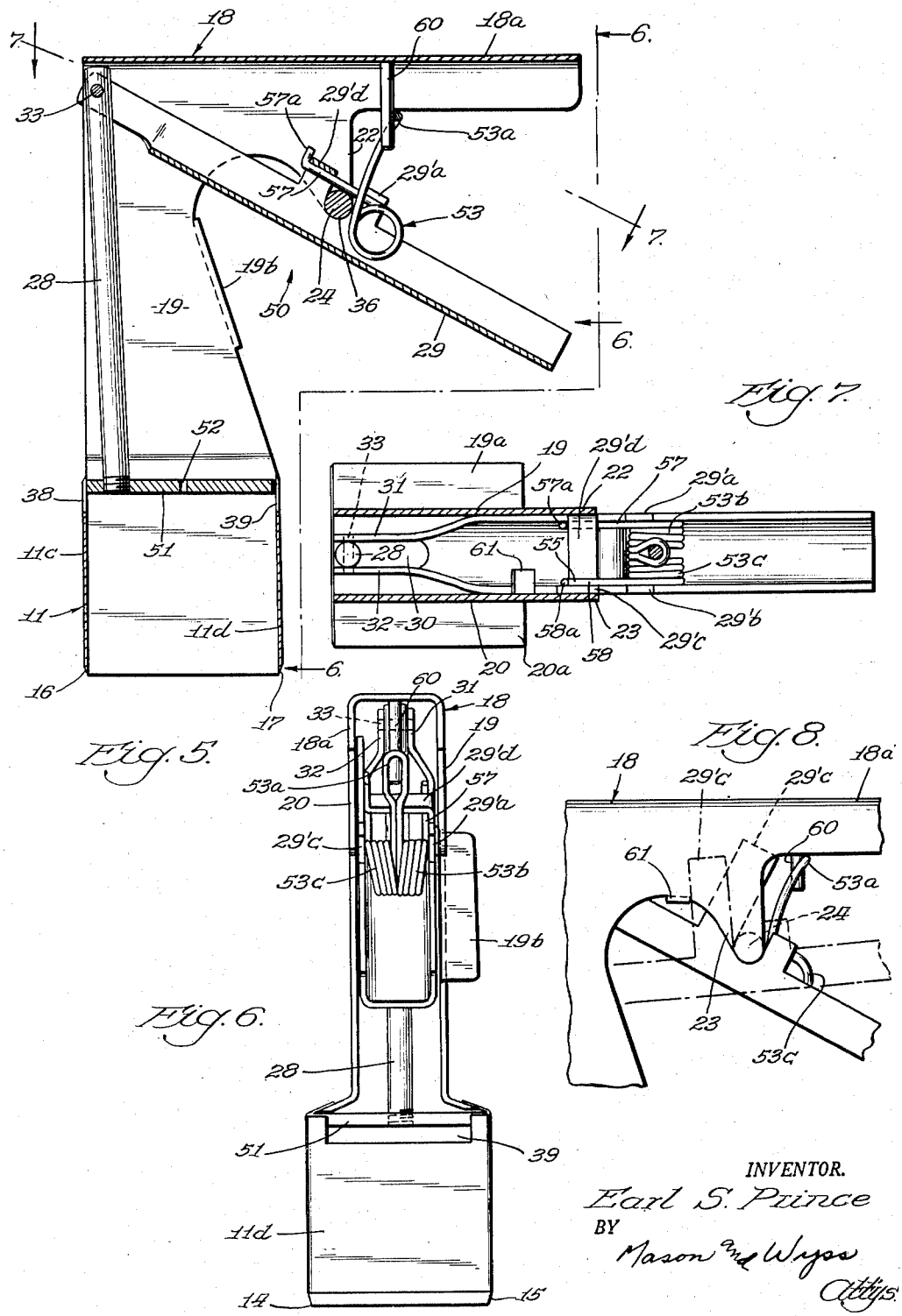

March 3, 1953  E. S. PRINCE  2,630,082
FOOD HANDLING IMPLEMENT
Filed Feb. 7, 1949  3 Sheets-Sheet 3
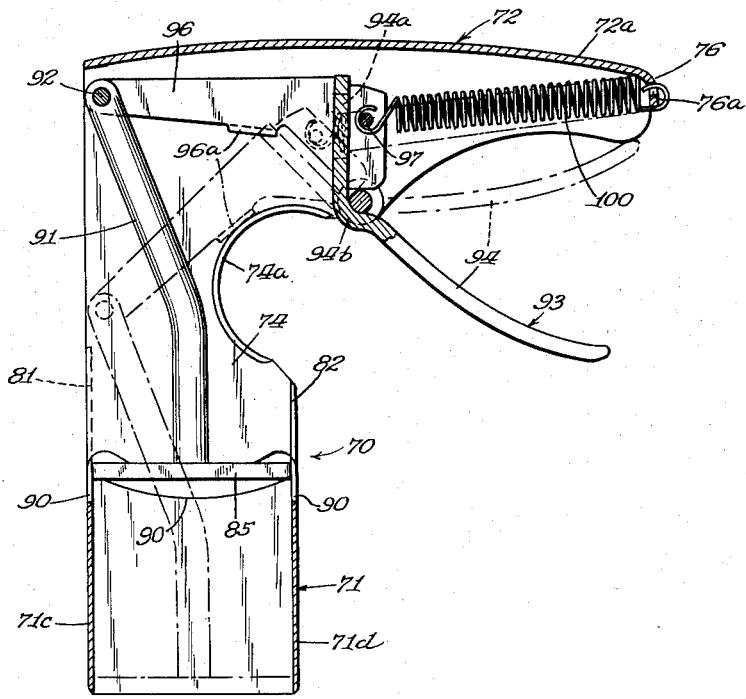
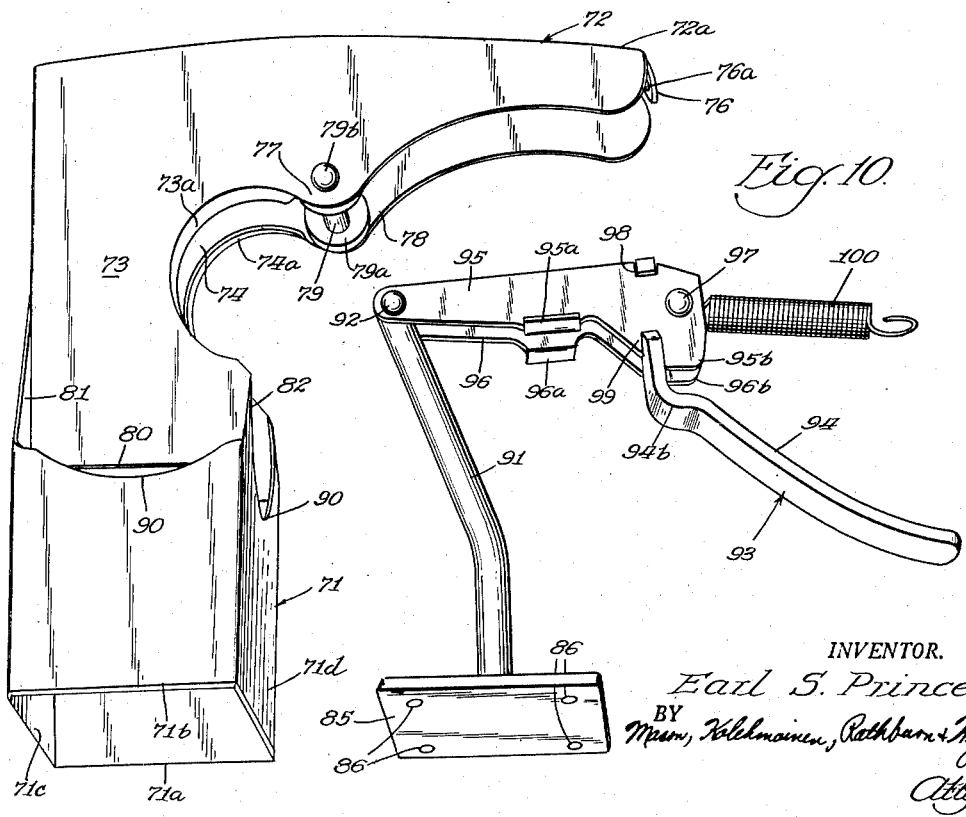
INVENTOR.
Earl S. Prince
BY Mason, Kolehmainen, Rathburn & Wyss
Attys.

Patented Mar. 3, 1953

2,630,082

UNITED STATES PATENT OFFICE 2,630,082

FOOD HANDLING IMPLEMENT

Earl S. Prince, Sterling, Ill.

Application February 7, 1949, Serial No. 74,884

11 Claims. (Cl. 107—48)

The present invention relates to a food handling implement, and more particularly to an implement for cutting, forming, and measuring quantities of foods such as ice cream, pastries, hamburgers, and the like, and for ejecting said measured quantities of food from the implement as desired. This invention has particular application as an improved implement to be used in place of commonly known ice cream scoops and the like. Specifically the present invention is a continuation in part of an application for Letters Patent of the United States, Serial No. 785,491, Prince, filed November 12, 1947, now abandoned.

As is well known, it is necessary to subject food handling implements, such as the ordinary ice cream scoop, to frequent cleaning operations, especially when these implements are used in public places such as soda fountains, ice cream bars, and similar establishments, in order to comply with sanitation and health standards. It would be desirable, therefore, to have a food handling implement which can be quickly disassembled and which may be left in this disassembled condition for short periods of time, as for example over-night, so that it may be thoroughly cleaned and left to dry, thus preventing the accumulation of mold and decay in the recesses and corners of the device. Commonly known ice cream scoops do not provide such a means for disassembly and are usually so constructed that food material can collect underneath certain portions of the movable member which is used to eject the ice cream.

Still referring to the ice cream scoop as an example of a food handling implement of the prior art, although it will be apparent that the food handling implement of the present invention may be used in place of implements of a similar nature for other foods, the conventional ice cream scoop is not constructed so that it may be readily inserted into a tightly packed hard frozen mass of ice cream due to the fact that the operator is not able to bring a substantial force to bear on the conventional scoop portion so as to insert it directly into the ice cream, but has rather to dig out a sufficient amount of the ice cream by a repeated scraping of the scoop over the surface of the food mass. In addition, the conventional scoop does not provide a comfortable and easily operated means for ejecting the food material from the scoop, the conventional ejector requiring the use of the thumb or forefinger as an ejector actuating means, the operating position of the thumb or forefinger being such a strained and unnatural one that an operator who is called upon to use the scoop continuously finds the use of the implement very tiring and laborious.

It is therefore an object of the present invention to provide a new and improved food handling implement in which one or more of the above mentioned disadvantages are eliminated.

It is another object of the present invention to provide a new and improved implement for cutting, forming and measuring quantities of food and for ejecting said measured quantities of food from the implement.

It is a further object of the present invention to provide a new and improved food handling implement wherein the component parts thereof may be quickly assembled and disassembled whereby rapid and thorough cleansing of the component parts is made possible.

It is a still further object of the present invention to provide a new and improved food handling implement which is particularly adapted for insertion into food materials having a hard consistency, the component parts thereof being detachably connected in cooperative relationship.

It is another object of the present invention to provide a new and improved food handling implement wherein excess food cannot collect in the recesses and corners of the implement.

It is still another object of the present invention to provide a new and improved food handling implement which is particularly adapted for insertion into food material of a hard consistency and from which food material may be rapidly and easily ejected by means of a squeezing or gripping action of the entire hand which is natural and comfortable to the operator.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 1 is a perspective view of a food implement embodying the present invention being inserted into a container of food material;

Fig. 2 is an end view of the food implement with the food receiving chamber partly broken away;

Fig. 3 is a sectional view of the implement taken along the line 3—3 of Fig. 2;

Fig. 4 is a sectional view of the food implement taken along the line 4—4 of Fig. 3 and shows the details of the quickly detachable hand grip feature;

Fig. 5 is an elevational sectional view of a modified implement embodying the present invention;

Fig. 6 is a view looking in the direction of line 6—6 of Fig. 5 assuming that Fig. 5 shows the complete implement;

Fig. 7 is a sectional view taken on line 7—7 of Fig. 5, also assuming that Fig. 5 shows the complete implement;

Fig. 8 is a partial side view to illustrate the detachable feature of the implement shown in Fig. 5;

Fig. 9 is an elevational view in section of a modified implement embodying the present invention; and Fig. 10 is a partially exploded perspective view of the implement of Fig. 9.

Referring now to Figs. 1 to 4 of the drawings, the food handling implement which is indicated generally at 10 is shown with the food receiving chamber 11 of the implement about to be inserted into a mass of food material 12 disposed in a rectangular food container, one corner of which is shown in the drawing at 13. The food receiving chamber 11 has been shown as having a rectangular cross section and is comprised of sides 11a, 11b, 11c, and 11d which may be made of relatively thin sheet metal, such as stainless steel, for example. The bottom edges of the sides of the chamber 11 are sharpened to form knife-like edges such as knife-like edges 14, 15, 16 and 17 which facilitate the insertion of the food receiving chamber 11 into food material of a hard consistency. The food receiving chamber 11 may be very simply and economically constructed with a minimum of time and labor expended by a single metal stamping operation as will be evident to those skilled in the art. While this food chamber 11 has been illustrated as being rectangular in cross section, it will be apparent that the chamber may have any desired cross sectional shape or configuration, and the present invention is not to be regarded as being limited to the rectangular food chamber which is shown in the drawing merely for purposes of illustration.

In order to provide means for manipulating the food chamber 11 there is provided a generally channel shaped member 18 which is connected by means of a bifurcated shank comprising portions 19 and 20 to the end of the food chamber 11 remote from the knife-like edges 14, 15, 16 and 17 referred to above. This channel-shaped member as illustrated includes a hand grip portion 18a which extends in a line perpendicular to the line of insertion of the food chamber. As the handle portion 18a is somewhat narrower than the corresponding dimension of the food chamber, the shank portions 19 and 20 are flared outwardly at 19a and 20a to meet the corresponding edges of the food chamber, connection between these flared portions 19a, 20a and the sides 11a, 11b of the food chamber being accomplished by a suitable welding operation or similar process. Preferably the hand grip portion 18a includes integral depending projections 22 and 23 for supporting a pivot bar 24 of generally circular cross section. This pivot bar 24 is illustrated as being secured between the extremities of the projections 22 and 23 by a simple welding operation or the like, as is best shown in Figs. 3 and 4 of the drawings. It is obvious that the entire channel shaped member 18, including the hand grip portion 18a, the shank portions 19 and 20 and the projections 22 and 23 may be very simply formed from sheet metal at low cost by a single metal stamping operation.

In order properly to eject food material which has been received in the food chamber 11, a plunger member or ejector 26 is positioned within the chamber 11 and the dimensions of this plunger are made to conform to the inside dimensions of the food chamber 11. Plunger 26 is preferably constructed with a plurality of suitable openings such as 27 clearly shown in Fig. 3 of the drawings, which permit the equalization of air pressure on both sides of the plunger as the plunger is moved inside the chamber and as the chamber is inserted or withdrawn from the food material mass. Plunger 26 is movable throughout substantially the entire length of the food chamber by means of a hand actuated linkage comprising a plunger rod 28 and a movable channel shaped hand grip member or lever 29. One end of the plunger rod 28 is positioned in a U-shaped notch 30 formed in one end of movable member 29, the sides adjacent this notch 30 being bent inwardly to form supporting arms 31 and 32 which support a pivot pin 33. Pivot pin 33 pivotally secures the plunger rod 28 between the supporting arms 31 and 32. The other end of plunger rod 28 is securely connected to the plunger 26 at 34 as by a suitable threaded connection or the like.

For the purpose of pivotally supporting the lever 29 relative to the channel shaped member 18, the lever 29 is provided with two pairs of finger like members 29a, 29b, 29c, and 29d integrally formed therewith. The finger like members 29a and 29b have the ends thereof bent at right angles to form a closed loop with the ends abutting as indicated at 35 in Fig. 4 of the drawings. The fingers 29c is bent over to engage the finger 29d which extends parallel with the sides of the channel shaped lever 29. Between the pairs of fingers 29a—29b and 29c—29d there is provided a notch 36 which is of sufficient width to accommodate the pivot bar 24. Thus it is apparent that when member 29 is moved upward so that the notch 36 therein encloses the pivot bar 24 the member 29 will pivot about the pivot bar 24, and when a squeezing or gripping force is applied between members 18a and 29 the member 29 will act as a lever of the first class, the pivot bar 24 acting as a fulcrum, and will transmit this force through the plunger rod 28 to plunger 26 thus moving the plunger downward inside the food chamber 11 and ejecting the food material therefrom.

To return the plunger 26 to its normal position at the top of the food chamber 11 a flat spring 37 is compressed into the shape of an S and placed between the fixed hand grip portion 18a and the movable hand grip member 29, spring 37 thus exerting a biasing force between one end of these members which tends to keep them separated. Plunger 26 is limited in its upward travel by encountering the junction of the flared portions 19a and 20a and sides 11a and 11b of the food chamber, these junctions forming shoulders against which the plunger 26 is maintained through the biasing action of the spring 37.

To manipulate the food implement the palm of the operator is placed upon the stationary handle portion 18a and the fingers of the operator grip the movable member 29 in the manner of the conventional handshake. It is apparent that the construction of the food implement allows the operator to exert a considerable downward force at a comfortable angle so that the food chamber may be easily inserted into hard consistency foods. It will also be seen that the squeezing action which is used to eject food from the food chamber is a comfortable and natural one for the operator, this action utilizing the force of the entire hand of the operator whereby the use of the implement is made easier and less tiring on the operator. Due to the overall shape of the hand grip, which is in the nature of a V, the forefinger of the operator tends to ride into the edge of the shank portion 19 and cause abrasions of the skin. To prevent this, a flange 19b, which is best illustrated in Fig. 2 of the drawings, is formed from shank portion 19 and is integral therewith so that a smooth surface is presented at this point. It is obvious that a corresponding flange could be formed on the shank portion 20 if the implement were to be used by a left-handed operator.

It will be understood that food handling implements of the above mentioned type are often disposed in water in a dipper well between short periods of non-use. When the food chamber 11 is thrust into the dipper well, some water will be trapped above the plunger or ejector 26. To prevent this water from remaining in the space and being held there by a semi-vacuum condition which would exist when the implement is removed from the dipper well, there are provided relief slots 38 and 39. By virtue of these relief slots the operator does not take out any substantial amount of water when removing the food handling implement from the dipper well. It will be understood that if water is permitted to cling to the implement it will change to ice crystals when the cold ice cream is contacted, which is very undesirable. The slots 38 and 39 also prevent the accumulation of excess food material or liquids in corners and recesses of the implement. As illustrated these relief slots extend along substantially the entire length of sides 11c and 11d and allow the excess food or liquid which may be pumped up over the plunger 26 to be returned to the food container.

It is an important feature of the present invention to provide means for quickly detaching the component parts of the food implement whereby they may be thoroughly cleaned and sterilized.

Briefly, this quickly detachable feature is accomplished by utilizing one end of the spring 37 as a keeper which acts to retain the pivot bar 24 in the notch 36 in the movable hand grip member 29. When the lower portion of the spring 37 is moved rearwardly, the end of the spring is pulled out of its position as keeper over the pivot bar 24 and the member 29 falls away from the pivot bar 24, the entire ejector linkage being removed through the food chamber opening.

Referring now to Figs. 3 and 4 wherein the above-mentioned quickly detachable connection is set forth in more detail, the spring 37 is shown in a compressed S-shaped position between the fixed hand grip member 18 and the movable hand grip member 29, these members being shown in their assembled condition. One end of the spring is constructed with an opening which fits over a lug 40 which projects from the underside of member 18. The other end of the spring 37 is provided with a relatively wide portion 37a which fits over the pivot bar 24 and underneath shoulders, which are defined by the deformed fingers 29a, 29b and 29c. The portion 37a of the spring 37 is provided with a laterally extending groove or depression 37b which fits the contour of pivot bar 24 and which acts as a detent against removal of the spring during ordinary handling of the implement. While any other convenient means may be employed to provide the shoulders referred to above on the movable member 29, the use of the fingers, 29a, 29b and 29c is preferred.

In order that the side walls of member 29 may also be used to provide a stop arm for limiting the downward travel of the plunger 26, the end of the deformed finger 29c which finger forms one of the shoulders for engaging the spring 37 is welded at 42 to the upwardly extending finger 29d which forms a stop arm. A stop member 44 in the form of a metal block or stud is secured to shank portion 19 in the proper position to check the travel of the stop arm 29d when the member 29 has pushed the plunger 26 to the bottom of the chamber 11.

The entire member 29 comprising the support arms 31 and 32, the notch 36, the shoulders defined by the fingers 29a, 29b and 29c and the stop arm 29d, may be constructed in an economical and simple manner from a single piece of sheet metal by means of a single metal stamping operation and suitable bending operation. Thus the entire implement can be manufactured almost completely from sheet metal by simple metal stamping operations whereby a structure of sturdy construction, light weight, and low cost is obtained having the functional advantages described above.

In view of the detailed description included above, the operation of the food handling implement of the present invention will be apparent. The disassembly thereof will also be readily apparent. Referring to Fig. 3 of the drawings for example, it will be understood that disassembly of the implement is accomplished merely by removing the end of the spring 37 from the lug 40 and pulling the spring along the longitudinal axis of the member 29 away from the pivot 33 so as to remove the portion 37a of the spring 37 from beneath the shoulders defined by the fingers 29a, 29b and 29c. When the spring 37 is completely removed the member 29 to which the plunger rod 28 and the plunger 26 are attached may be moved free of the pivot rod 24.

Another embodiment of the present invention is illustrated in the Figs. 5, 6, 7 and 8 of the drawings. The corresponding parts of Figs. 5 to 8 inclusive are designated by the same reference numerals as in the preceding figures. The food handling implement of Fig. 5 generally designated by the reference numeral 50 differs from the food-handling implement described above in substantially only two particulars. First of all, the plunger designated by the reference numeral 51 and threadedly engaged with the plunger rod 28 is formed of much thicker material than the plunger 26 and in fact is many times thicker than the walls 11a, 11b, 11c and 11d of the food chamber 11. It is, of course, desirable when the implement is used for measuring quantities of ice cream that the ice cream remains within the scoop portion or chamber 11 until forcibly ejected therefrom by the downward movement of the plunger 51. By virtue of the fact that walls of the chamber 11 are formed of relatively thin material the insertion of the chamber 11 into a mass of ice cream will cause these walls to be rapidly cooled to substantially the temperature of the ice cream whereby the ice cream will cling sufficiently thereto until forcibly ejected by operation of the plunger 51. If the walls of the chamber 11 had substantial mass they would not be cooled rapidly upon insertion into the ice cream with a result that a melting action would occur causing the ice cream to tend to slip out of the food chamber.

On the other hand it is desired that no clinging action occurs between the ice cream and the plunger 51. This is accomplished by making the plunger 51 of relatively thick material so that it has a substantial mass to hold sufficient heat to cause a slight melting action of the ice cream in contact therewith whereupon during the ejecting operation the ice cream will readily drop free from the plunger 51. The plunger 51 is preferably provided with a plurality of openings such as 52, only one of which is shown in the drawings.

The only other way in which the food handling implement of Figs. 5 to 8 inclusive differs substantially from the food handling implement 10 described above is with reference to the means for permitting ready assembly and disassembly thereof. It is possible that a flat spring such as 37 described above may lose its temper upon repeated operations thereof and accordingly in Figs. 5 to 8 of the drawings there is illustrated a coiled spring 53 which performs the same dual function performed by the spring 37 described above, namely, to act as a keeper to hold the disengageable parts together and also to provide desired spring force for returning the plunger to its uppermost or non-ejecting position. The movable handle member or lever 29 is substantially identical with the handle described above and is also provided with integrally formed pairs of fingers 29'a, 29'b, 29'c and 29'd. The notch 36 is defined between the pairs of fingers 29'a—29'b and 29'c—29'd. The fingers 29'a and 29'b are relatively short and are not bent over to define a shoulder as in the previously described arrangement. However, finger 29'd is bent over toward the finger 29'c and welded thereto as indicated at 55, the finger 29'c extending upwardly so as to define a stop arm substantially identical with the stop arm 29d described above.

The coiled spring 53 essentially comprises a continuous length of spring wire with the central position thereof bent in the form of a hair pin loop 53a with the portions on either side of this loop formed into coils designated as 53b and 53c respectively arranged with their axes substantially coincident so as to produce the appearance of a single coiled spring. The ends of each of the coils 53b and 53c extend tangentially from the coils themselves in the form of a pair of arms 57 and 58 having hook-shaped ends 57a and 58a respectively. The arms 57 and 58 are adapted to extend over the pivot pin 24 and beneath the shoulder defined by the finger 29'd. The hook-shaped ends 57a and 58a retain the arms in this position once the spring arms 57 and 58 are moved beneath the shoulder referred to. The fingers 29'a and 29'b tend to maintain the coiled spring 53 in position within the channel-shaped movable handle member 29, limiting endwise movement thereof. In order to relate the coiled spring 53 to the fixed handle portion 18a the hair pin loop 53a is slipped over the end of a pin 60 depending from the fixed handle portion 18a. This action also initially stresses the coiled spring 53 sufficiently so as to cause the plunger 51 to assume the position shown in Fig. 5 of the drawings.

For the purpose of limiting the maximum downward movement of the plunger 51 during its normal use the stationary handle portion 18 is preferably provided with a stop member 61 illustrated as a portion of the handle member 18 bent at right angles into the path of movement of the finger 29'c. It will be understood that any other suitable stop arrangement might equally well be employed. In Figure 8 of the drawings there are illustrated two positions of the finger 29'c, one when in engagement with the stop member 61 and the other corresponding to the fully retracted position of the plunger 51.

What is at present believed to be the preferred embodiment of the present invention is illustrated in Figs. 9 and 10 of the drawings. Except for certain minor details the food-handling implement generally designated at 70, in Fig. 9, differs from the food handling implements of the preceding figures primarily in the dual function spring means for holding the parts in assembled relationship while also providing the force for moving the plunger to its retracted position. The food-handling implement 70 comprises a dipper portion or food-receiving chamber 71, which as in the preceding embodiments, has a rectangular cross section and is comprised of side walls 71a, 71b, 71c and 71d preferably formed of relatively thin sheet metal such as stainless steel. The bottom edges of the sides of the chamber 71 are sharpened to form knifelike edges to facilitate the insertion of the food-receiving chamber 71 into food material of hard consistency such for example as ice cream, which is at a relatively low temperature.

To provide means for manipulating the food-receiving chamber 71 there is provided a generally channel-shaped member 72 which is connected by means of a bifurcated shank comprising portions 73 and 74 to the end of the food chamber 71 remote from the knifelike edges referred to above. This channel-shaped member 72 as illustrated includes an end grip portion 72a which extends in a line substantially perpendicular to the line of insertion of the food chamber into a food mass. Actually the channel-shaped member 72 has a slightly arcuate top surface to provide a more streamlined appearance and the web portion of the channel-shaped member adjacent one end is bent downwardly as indicated at 76 not only to improve the appearance, but also to provide a supporting means for a tension spring to be described in detail hereinafter.

Preferably the hand grip portion 72a includes integrally depending projections 77 and 78 adjacent the central portion thereof for supporting a pivot bar 79. As illustrated the pivot bar 79 is essentially a spool shaped member having flanges 79a and rivet extensions 79b. The flanges 79a engage the adjacent faces of the projections 77, 78. It will be apparent that by employing such a spool-shaped pivot bar 79 that substantial rigidity is added to the hand grip portion 72a since the flanges 79a prevent the edges of the channel shaped member 72 from being compressed toward each other and the rivet extensions 79b prevent separation thereof.

The edges of the shank portions 73 and 74 between the pivot bar 79 and the chamber 71 are preferably deformed to provide short lateral flanges 73a and 74a so as to provide a surface which will not injure the operator's hand and also to provide a stop member for limiting the maximum movement in the downward direction of the food ejecting plunger to be described hereinafter. Preferably the shank portions 73 and 74 are parallel with each other throughout the extent thereof and the lower edges 80 thereof provide a stop limiting the maximum upward movement of the ejector or plunger to be described hereinafter. The chamber 71 is integrally related with the shank portions 73 and 74 of the channel-shaped member 72 by virtue of lateral triangular-shaped flanges 81 and 82 associated with each of the shank portions 73 and 74. It will be apparent that both the channel-shaped member 72 and the food-handling chamber 71 may be formed by a simple stamping operation coupled with a metal-bending operation.

For the purpose of ejecting food material received within the chamber 71 there is provided a plunger member 85 which is preferably formed of substantial thickness as contrasted with the side walls of the chamber 71 for the purpose set forth in connection with the preceding embodiment. The plunger 85 is preferably provided with a plurality of openings 86 and is reciprocally movable within the food chamber 71. The food chamber 71 as in the preceding embodiments is provided with relief slots 90 which effectively are cut away portions of the chamber 71 so as to provide openings beneath the plunger 85 when in its uppermost position as shown in the drawings thereby limiting the amount of water which may tend to cling to the food handling implement 70 when removed from a food dipper well where it is conventionally maintained, particularly when used for dipping ice cream.

The ejector or plunger 85 is preferably rigidly connected to a plunger rod 91 which in turn is pivotally connected as by means of a pivot 92 with a movable member or manually actuable lever generally designated at 93 and effectively comprising elements 94, 95, 96, and 97. The element 94 is a hand-engaging member provided with a notched out portion 94a at either side thereof for receiving therein a portion of the elements 95 and 96 which are each provided along the edges thereof with opposed notches 98 and 99. The element 97 is a rivet which clamps the elements 95 and 96 together in integral relationship with the element 94 so as to provide a unitary movable member 93 having a bifurcated portion defined by the members 95 and 96 to receive the plunger rod 91 therebetween, which is connected thereto by a pin 92 extending through the bifurcations and also the plunger rod 91. Each of the elements 95 and 96 is provided with a lateral flange portion 95a and 96a acting as stop members for engaging with the flanges 73a and 74a respectively as illustrated in the dotted lines in Fig. 9 of the drawings thereby limiting the maximum downward movement of the plunger 85.

The element 94 adjacent the junction with the elements 95 and 96 is provided with a curved portion 94b which cooperates with the adjacent ends of the elements 95 and 96 designated as 95b and 96b to effectively form a notch therebetween for receiving the pivot bar 79 in a manner clearly apparent from Fig. 9 of the drawings. A tension spring 100 having one end hooked over the pin 97 and the other end hooked into an opening 76a in the downwardly projecting portion 76 tends to hold the pivot bar 79 within the notch effectively defined between the portions 94b and 95b—96b thereby maintaining the device in assembled relationship. The spring 100 performs a dual function as in the preceding embodiments with respect to holding the parts in assembled relationship and furthermore providing a bias to move the plunger 85 to its retracted position and also to move the movable member 93 away from the handle portion 72a.

In view of the detailed description included above the operation of the food-handling implement 70 which is essentially similar to that of the preceding embodiments will be understood by those skilled in the art. It will be furthermore apparent that there has been provided a very simple food-handling implement which may be manufactured in a very inexpensive manner and yet which provides a device of sturdy construction readily disassembled for cleaning purposes and which will give long years of foolproof operation.

It will be apparent to those skilled in the art that the present invention is not limited to the particular constructions shown or method of employing the same and that changes and modifications may be made without departing from the spirit and scope of the present invention. It is aimed in the appended claims to cover all such changes and modifications.

What is claimed as new and desired to be secured by Letters Patent of the United States is:

1. An implement for delivering a predetermined amount of a food material comprising, a food-receiving chamber, a plunger positioned within said chamber and reciprocally movable throughout the full length of said chamber, a fixed hand grip member integral with said chamber having a pivot bar at the central portion thereof, a movable hand grip member having means effectively defining a notch along one edge thereof for receiving said pivot bar therein, means connecting one end of said movable hand grip member with said plunger, and readily removable spring means releasably connected to both said movable and fixed hand grip members for holding said pivot bar in said notch and for also biasing said plunger toward one end of said chamber, whereby upon release of said spring means said pivot bar is moved out of said notch for ready disassembly of said implement.

2. An implement for delivering a predetermined amount of a food material comprising a food-receiving chamber, a plunger positioned within said chamber and reciprocally movable throughout the full length of said chamber, a fixed channel-shaped hand grip member integral with said chamber having a pivot bar at the central portion thereof extending between the flanges of the channel and adding rigidity thereto, a movable hand grip member having means effectively defining a notch at one edge thereof for receiving said pivot bar therein, means connecting one end of said movable hand grip member with said plunger, readily releasable spring means removably connected to both said movable and fixed hand grip members for holding said pivot bar in said notch and also biasing said plunger toward one end of said chamber whereby upon release of said spring means said pivot bar is moved out of said notch for disassembly of said implement.

3. An implement for delivering a predetermined amount of a food material comprising, a food-receiving chamber, a plunger positioned within said chamber and reciprocally movable throughout the full length of said chamber, a fixed hand-grip member integral with said chamber having a pivot bar at the central portion thereof, a movable hand-grip member having means effectively defining a notch along one edge thereof for receiving said pivot bar therein, stop means defined on said movable member, cooperating stop means defined on said fixed member, means connecting one end of said movable handgrip member with said plunger, and readily removable spring means releasably connected to both said movable and fixed hand grip members for holding said pivot bar in said notch and for also biasing said plunger toward one end of said chamber, whereby upon release of said spring means said pivot bar is moved out of said notch for ready disassembly of said implement.

4. An implement for delivering a predetermined amount of a food material comprising, a rectangular food-receiving chamber, a plunger positioned within said chamber and reciprocally movable throughout the full length of said chamber, a fixed hand grip member integral with said chamber and positioned approximately perpendicular to the line of insertion of said chamber into a food mass, a pivot bar rigidly connected to said fixed member at an intermediate point thereof, a movable hand-grip member positioned below said fixed member and having means effectively defining a notch along one edge thereof for receiving said pivot bar therein, means connecting one end of said movable hand-grip member with said plunger, and readily removable spring means releasably connected to both said movable and fixed hand-grip members for holding said pivot bar in said notch and for also biasing said plunger toward one end of said chamber, whereby upon release of said spring means said pivot bar is moved out of said notch for ready disassembly of said implement.

5. In combination with an implement for delivering a predetermined amount of food material comprising a food-receiving chamber, a plunger positioned within said chamber and reciprocally movable therein throughout substantially the full length of said chamber, said implement including a detachable hand-grip assembly comprising a first channel member having a pivot bar connected between opposite sides thereof, a second channel member having a centrally disposed notch in the side portions thereof, said pivot bar being positioned, within said notch, a portion of the sides of said second member adjacent said notch being bent over to form abutments on either side of said notch, and a resilient member biasing one end of said first and second members apart, one end of said resilient member being positioned under said abutments and over said pivot bar whereby said first and second members are detachably connected in cooperative relationship.

6. An implement for delivering a predetermined amount of food material comprising a rectangular food-receiving chamber insertable into said food material, a plunger positioned within said chamber and movable therein throughout substantially the full length of said chamber, a first channel member integral with said chamber and positioned substantially perpendicular to the line of insertion of said chamber, a pivot bar connected between opposite sides of said first channel member, a second channel member having a centrally disposed notch in the side portions thereof, said pivot bar being positioned within said notch, a portion of the sides of said second channel member adjacent said notch being bent over to form shoulders on either side of said notch, a plunger rod connecting one end of said second channel member and said plunger, and an S-shaped flat spring positioned between said channel members, one end of said spring fitting over a projecting lug on said first channel member and the other end of said spring being insertable under said shoulders and over said pivot bar whereby said channel members are detachably connected together.

7. An implement for delivering a predetermined amount of food material comprising a food-receiving chamber insertable into said food material, a plunger positioned within said chamber and movable therein throughout substantially the full length of said chamber, a first channel member integral with said chamber and positioned substantially perpendicular to the line of insertion of said chamber, a pivot bar connected between opposite sides of said first channel member, a second channel member having a substantially centrally disposed notch in the side portions thereof, said pivot bar being positioned within said notch, means defining a shoulder adjacent said notch, a plunger rod connecting one end of said channel member and said plunger, and a coiled spring positioned between said channel members, one portion of said spring fitting over a projecting lug on said first channel member and another portion of said spring being insertable under said shoulder and over said pivot bar whereby said channel members are detachably connected together.

8. In combination with an implement for delivering a predetermined amount of food material comprising a food-receiving chamber, a plunger positioned within said chamber and reciprocally movable therein throughout substantially the full length of said chamber, said implement including a detachable hand-grip assembly comprising a first channel member having a pivot bar rigidly connected between opposite sides thereof to afford increased rigidity to said channel member, a second member comprising means defining an effective notch along one edge thereof for receiving said pivot bar therein, and tension spring means connected between said first and second members for holding said pivot bar in said notch and for simultaneously biasing said second member toward a predetermined position relative to said first member.

9. An implement for delivering a predetermined amount of food material comprising a rectangular food-receiving chamber insertable into said food material, a plunger positioned within said chamber and movable therein throughout substantially the full length of said chamber, a channel member integral with said chamber and positioned substantially perpendicular to the line of insertion of said chamber, a pivot bar connected between opposite sides of said channel member, a second member comprising a pair of spaced parallel plate elements and a manually graspable element, means comprising cooperating notches in said elements and a pin extending between said plate elements for integrally relating said elements to form said second member, a notch defined between the adjacent ends of said plate elements and a deformation in said manually graspable element for receiving said pivot bar, means defining a plunger rod connected between said plates and said plunger, and a coiled tension spring having one end connected to said pin and the other end connected to the end of said channel member remote from said chamber for holding said pivot bar in said notch, and for biasing said plunger toward one end of said food receiving chamber.

10. In a device of the character described, a food-receiving chamber, a plunger reciprocal in said chamber, a detachable hand-grip assembly comprising a first channel member having a pivot bar rigidly connected between opposite sides thereof to afford increased rigidity to said channel member, a pair of spaced parallel shank portions integrally connecting said food-receiving chamber and said first channel member, a second member comprising means defining an effective notch along one edge thereof for receiving said pivot bar therein, means interconnecting said plunger and said second member, tension spring means connected between said first and second members for holding said pivot bar in said notch and for simultaneously biasing said second member toward a predetermined position relative to said first member, the ends of said shank portions adjacent said food-receiving portion limiting movement of said plunger in one direction, and cooperating stop means on said shank portions and said second member for limiting movement of said plunger in said other direction.

11. An implement for delivering a predetermined amount of food material comprising primarily sheet metal stampings including a rectangular food-receiving chamber insertable into said food material, a plunger positioned within said chamber and movable therein throughout the full length of said chamber, a channel member positioned approximately perpendicular to the line of insertion of said chamber, a pair of spaced parallel integral extensions of said channel member disposed parallel to said line of insertion integrally connected to said chamber, a pivot bar connected between opposite sides of said channel member, a second member having a bifurcated end and including means effectively defining a notch at an intermediate portion thereof for receiving said pivot bar, means defining a plunger rod connected between said bifurcated end of said second member and said plunger, and spring means connected between said members for holding said pivot bar in said notch and for biasing said plunger toward one end of said food-receiving chamber.

EARL S. PRINCE.

REFERENCES CITED

The following references are of record in the file of this patent:

UNITED STATES PATENTS

| Number | Name | Date |
|--------|------|------|
| 869,879 | Cameron | Nov. 5, 1907 |
| 1,182,567 | Ipsen | May 9, 1916 |
| 1,526,753 | Levene | Feb. 17, 1925 |
| 1,535,871 | Stahley | Apr. 28, 1925 |
| 1,583,072 | Landman | May 4, 1926 |